United States Patent
Panasyuk et al.

(10) Patent No.: US 7,661,129 B2
(45) Date of Patent: Feb. 9, 2010

(54) SECURE TRAVERSAL OF NETWORK COMPONENTS

(75) Inventors: Anatoliy Panasyuk, Pennant Hills (AU);
Andre Kramer, Cambridge (GB);
Bradley Jay Pedersen, Parkland, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 873 days.

(21) Appl. No.: 10/083,324

(22) Filed: Feb. 26, 2002

(65) Prior Publication Data

US 2003/0163569 A1 Aug. 28, 2003

(51) Int. Cl.
*H04L 9/32* (2006.01)
*G06F 15/16* (2006.01)
*G06F 17/30* (2006.01)

(52) U.S. Cl. ............... 726/10; 726/8; 713/155; 713/168; 713/175

(58) Field of Classification Search .......... 713/155, 713/168, 175; 726/8, 10
See application file for complete search history.

(56) References Cited

U.S. PATENT DOCUMENTS

| | | | |
|---|---|---|---|
| 4,438,511 A | 3/1984 | Baran | |
| 4,649,510 A | 3/1987 | Schmidt | 364/900 |
| 4,736,369 A | 4/1988 | Barzilai | |
| 4,750,171 A | 6/1988 | Kedar et al. | |
| 4,768,190 A | 8/1988 | Giancarlo | |
| 4,837,800 A | 6/1989 | Freeburg et al. | |
| 4,893,307 A | 1/1990 | McKay et al. | |
| 4,912,756 A | 3/1990 | Hop | |
| 4,924,378 A | 5/1990 | Hershey et al. | 364/200 |
| 4,941,089 A | 7/1990 | Fischer | |
| 4,953,159 A | 8/1990 | Hayden et al. | |
| 5,010,549 A | 4/1991 | Katou et al. | |
| 5,021,949 A | 6/1991 | Morten et al. | |
| 5,159,592 A | 10/1992 | Perkins | |
| 5,181,200 A | 1/1993 | Harrison | |

(Continued)

FOREIGN PATENT DOCUMENTS

EP 0 384 339 A2 8/1990

(Continued)

OTHER PUBLICATIONS

Kyung-Ah Chang: Tae-Seung Lee; Bang-Hun Chun; Tai-Yun Kim, "Ticket-based secure delegation service supporting multiple domain models," Dependable Computing, 2001. Proceedings. 2001 Pacific Rim International Symposium on , vol., No., pp. 289-292, 2001.*

(Continued)

*Primary Examiner*—Matthew T Henning
(74) *Attorney, Agent, or Firm*—Choate, Hall & Stewart, LLP

(57) ABSTRACT

A method and apparatus for authenticating a client to a content server. A ticket authority generates a ticket associated with the client. The ticket comprises a first ticket and a second ticket. The ticket authority transmits the first ticket to the client and the client uses the first ticket to establish a communication session with an content server proxy. The ticket authority then transmits a second ticket to the content server proxy and the content server proxy uses the second ticket to establish a communication session with the content server.

67 Claims, 6 Drawing Sheets

U.S. PATENT DOCUMENTS

| | | | |
|---|---|---|---|
| 5,204,897 A | 4/1993 | Wyman | 380/4 |
| 5,210,753 A | 5/1993 | Natarajan | |
| 5,212,806 A | 5/1993 | Natarajan | |
| 5,220,501 A | 6/1993 | Lawlor et al. | |
| 5,224,098 A | 6/1993 | Bird et al. | |
| 5,241,542 A | 8/1993 | Natarajan et al. | |
| 5,276,680 A | 1/1994 | Messenger | |
| 5,307,490 A | 4/1994 | Davidson et al. | |
| 5,325,361 A | 6/1994 | Lederer et al. | |
| 5,349,678 A | 9/1994 | Morris et al. | |
| 5,359,721 A | 10/1994 | Kempf et al. | 395/425 |
| 5,390,297 A | 2/1995 | Barber et al. | 395/200 |
| 5,410,543 A | 4/1995 | Seitz et al. | |
| 5,412,654 A | 5/1995 | Perkins | |
| 5,412,717 A | 5/1995 | Fischer | 380/4 |
| 5,416,842 A | 5/1995 | Aziz | |
| 5,426,637 A | 6/1995 | Derby et al. | |
| 5,442,633 A | 8/1995 | Perkins et al. | |
| 5,442,791 A | 8/1995 | Wrabetz et al. | |
| 5,446,736 A | 8/1995 | Gleeson et al. | |
| 5,446,915 A | 8/1995 | Pierce et al. | |
| 5,448,561 A | 9/1995 | Kaiser et al. | |
| 5,455,953 A | 10/1995 | Russell | 395/739 |
| 5,475,819 A | 12/1995 | Miller et al. | |
| 5,481,535 A | 1/1996 | Hershey | |
| 5,481,721 A | 1/1996 | Serlet et al. | |
| 5,490,139 A | 2/1996 | Baker et al. | |
| 5,491,750 A | 2/1996 | Bellare et al. | 380/21 |
| 5,491,800 A | 2/1996 | Goldsmith et al. | |
| 5,499,343 A | 3/1996 | Pettus | |
| 5,504,814 A | 4/1996 | Miyahara | 380/4 |
| 5,509,070 A | 4/1996 | Schull | 380/4 |
| 5,515,508 A | 5/1996 | Pettus et al. | |
| 5,524,238 A | 6/1996 | Miller et al. | 395/600 |
| 5,544,246 A | 8/1996 | Mandelbaum et al. | 380/23 |
| 5,548,723 A | 8/1996 | Pettus | |
| 5,550,976 A | 8/1996 | Henderson et al. | 395/200.06 |
| 5,550,981 A | 8/1996 | Bauer et al. | 395/200.06 |
| 5,553,060 A | 9/1996 | Obermanns et al. | |
| 5,553,139 A * | 9/1996 | Ross et al. | 705/59 |
| 5,557,678 A * | 9/1996 | Ganesan | 380/282 |
| 5,557,732 A | 9/1996 | Thompson | 395/161 |
| 5,559,800 A | 9/1996 | Mousseau et al. | |
| 5,564,016 A | 10/1996 | Korenshtein | 395/186 |
| 5,564,070 A | 10/1996 | Want et al. | |
| 5,566,225 A | 10/1996 | Haas | |
| 5,568,645 A | 10/1996 | Morris et al. | |
| 5,572,528 A | 11/1996 | Shuen | |
| 5,574,774 A | 11/1996 | Ahlberg et al. | |
| 5,586,257 A | 12/1996 | Perlman | |
| 5,586,260 A | 12/1996 | Hu | 395/200.2 |
| 5,592,549 A | 1/1997 | Nagel et al. | 380/4 |
| 5,594,490 A | 1/1997 | Dawson et al. | |
| 5,602,916 A | 2/1997 | Grube et al. | |
| 5,604,490 A | 2/1997 | Blakley, III et al. | 340/825.31 |
| 5,604,801 A | 2/1997 | Dolan et al. | |
| 5,610,595 A | 3/1997 | Garrabrant et al. | |
| 5,623,600 A | 4/1997 | Ji et al. | |
| 5,623,601 A | 4/1997 | Vu | |
| 5,627,821 A | 5/1997 | Miyagi | |
| 5,627,892 A | 5/1997 | Kauffman | |
| 5,633,868 A | 5/1997 | Baldwin et al. | |
| 5,638,358 A | 6/1997 | Hagi | |
| 5,638,513 A | 6/1997 | Ananda | 395/188.01 |
| 5,652,789 A | 7/1997 | Miner et al. | |
| 5,657,390 A | 8/1997 | Elgamal et al. | 380/49 |
| 5,664,007 A | 9/1997 | Samadi et al. | |
| 5,666,501 A | 9/1997 | Jones et al. | |
| 5,668,999 A | 9/1997 | Gosling et al. | |
| 5,671,354 A | 9/1997 | Ito et al. | 395/187.01 |
| 5,673,322 A | 9/1997 | Pepe et al. | |
| 5,682,534 A | 10/1997 | Kapoor et al. | |
| 5,689,708 A | 11/1997 | Regnier et al. | 395/682 |
| 5,717,737 A | 2/1998 | Doviak et al. | |
| 5,721,818 A | 2/1998 | Hanif et al. | |
| 5,724,346 A | 3/1998 | Kobayashi et al. | |
| 5,729,734 A | 3/1998 | Parker et al. | 395/609 |
| 5,732,074 A | 3/1998 | Spaur et al. | |
| 5,737,416 A | 4/1998 | Cooper et al. | 380/4 |
| 5,742,757 A | 4/1998 | Hamadani et al. | 395/186 |
| 5,748,897 A | 5/1998 | Katiyar | |
| 5,752,185 A | 5/1998 | Ahuja | |
| 5,754,774 A | 5/1998 | Bittinger et al. | |
| 5,758,186 A | 5/1998 | Hamilton et al. | |
| 5,768,525 A | 6/1998 | Kralowetz et al. | |
| 5,771,459 A | 6/1998 | Demery et al. | |
| 5,784,643 A | 7/1998 | Shields | |
| 5,794,207 A | 8/1998 | Walker et al. | 705/23 |
| 5,796,727 A | 8/1998 | Harrison et al. | |
| 5,812,671 A | 9/1998 | Ross, Jr. | 380/49 |
| 5,812,784 A | 9/1998 | Watson et al. | |
| 5,848,064 A | 12/1998 | Cowan | |
| 5,856,974 A | 1/1999 | Gervais et al. | |
| 5,889,816 A | 3/1999 | Agrawal et al. | |
| 5,909,431 A | 6/1999 | Kuthyar et al. | |
| 5,923,756 A * | 7/1999 | Shambroom | 713/156 |
| 5,933,412 A | 8/1999 | Choudhury et al. | |
| 5,935,212 A | 8/1999 | Kalajan et al. | |
| 5,944,791 A | 8/1999 | Scherpbier | 709/218 |
| 5,956,407 A | 9/1999 | Slavin | 380/30 |
| 5,968,176 A | 10/1999 | Nessett et al. | |
| 5,987,611 A | 11/1999 | Freund | |
| 6,006,090 A | 12/1999 | Coleman et al. | |
| 6,023,724 A | 2/2000 | Bhatia et al. | |
| 6,055,575 A | 4/2000 | Paulsen et al. | |
| 6,058,250 A | 5/2000 | Harwood et al. | |
| 6,058,480 A | 5/2000 | Brown | |
| 6,085,247 A | 7/2000 | Parsons et al. | |
| 6,088,451 A | 7/2000 | He et al. | |
| 6,091,951 A | 7/2000 | Stumiolo et al. | |
| 6,094,423 A | 7/2000 | Alfano et al. | |
| 6,101,543 A | 8/2000 | Alden et al. | |
| 6,112,085 A | 8/2000 | Garner et al. | |
| 6,131,116 A | 10/2000 | Riggins et al. | 709/219 |
| 6,145,109 A | 11/2000 | Schuster et al. | |
| 6,147,986 A | 11/2000 | Orsic | |
| 6,154,461 A | 11/2000 | Sturniolo et al. | |
| 6,161,123 A | 12/2000 | Renouard et al. | |
| 6,166,729 A | 12/2000 | Acosta et al. | |
| 6,167,513 A | 12/2000 | Inoue et al. | |
| 6,169,992 B1 | 1/2001 | Beall et al. | |
| 6,170,057 B1 | 1/2001 | Inoue et al. | |
| 6,170,075 B1 | 1/2001 | Schuster et al. | |
| 6,198,920 B1 | 3/2001 | Doviak et al. | |
| 6,199,113 B1 | 3/2001 | Alegre et al. | |
| 6,201,962 B1 | 3/2001 | Sturniolo et al. | |
| 6,226,618 B1 | 5/2001 | Downs et al. | 705/1 |
| 6,226,750 B1 | 5/2001 | Trieger | |
| 6,226,769 B1 | 5/2001 | Schuster et al. | |
| 6,230,004 B1 | 5/2001 | Hall et al. | |
| 6,233,617 B1 | 5/2001 | Rothwein et al. | |
| 6,233,619 B1 | 5/2001 | Narisi et al. | |
| 6,236,652 B1 | 5/2001 | Preston et al. | |
| 6,240,514 B1 | 5/2001 | Inoue et al. | |
| 6,243,753 B1 | 6/2001 | Machin et al. | |
| 6,249,818 B1 | 6/2001 | Sharma | |
| 6,256,739 B1 | 7/2001 | Skopp et al. | |
| 6,266,418 B1 | 7/2001 | Carter et al. | |
| 6,269,402 B1 | 7/2001 | Lin et al. | |
| 6,289,461 B1 | 9/2001 | Dixon | 713/201 |
| 6,308,281 B1 | 10/2001 | Hall et al. | |
| 6,336,135 B1 | 1/2002 | Niblett et al. | |
| 6,349,337 B1 | 2/2002 | Parsons et al. | |
| 6,360,265 B1 | 3/2002 | Falck et al. | |

| | | |
|---|---|---|
| 6,415,329 B1 | 7/2002 | Gelman et al. |
| 6,418,324 B1 | 7/2002 | Doviak et al. |
| 6,421,768 B1* | 7/2002 | Purpura ..................... 711/164 |
| 6,449,651 B1 | 9/2002 | Dorfman et al. ............ 709/229 |
| 6,484,206 B2 | 11/2002 | Crump et al. |
| 6,487,690 B1 | 11/2002 | Schuster et al. |
| 6,496,520 B1 | 12/2002 | Acosta |
| 6,502,144 B1 | 12/2002 | Accarie |
| 6,505,241 B2 | 1/2003 | Pitts |
| 6,546,425 B1 | 4/2003 | Hanson et al. |
| 6,560,650 B1 | 5/2003 | Imai |
| 6,564,320 B1* | 5/2003 | de Silva et al. .............. 713/156 |
| 6,574,239 B1 | 6/2003 | Dowling et al. |
| 6,605,241 B2 | 8/2003 | Asakawa et al. |
| 6,606,708 B1 | 8/2003 | Devine et al. |
| 6,609,198 B1* | 8/2003 | Wood et al. .................. 713/155 |
| 6,611,522 B1 | 8/2003 | Zheng et al. |
| 6,661,806 B1* | 12/2003 | Eriksson et al. ............ 370/468 |
| 6,671,729 B1 | 12/2003 | Gordon et al. |
| 6,681,017 B1 | 1/2004 | Matias et al. |
| 6,691,232 B1* | 2/2004 | Wood et al. .................. 713/201 |
| 6,697,377 B1 | 2/2004 | Ju et al. |
| 6,714,536 B1 | 3/2004 | Dowling |
| 6,725,376 B1* | 4/2004 | Sasmazel et al. ............... 726/10 |
| 6,766,373 B1 | 7/2004 | Beadle et al. |
| 6,826,696 B1* | 11/2004 | Chawla et al. .............. 713/201 |
| 6,832,260 B2 | 12/2004 | Brabson et al. |
| 6,845,387 B1 | 1/2005 | Prestas et al. |
| 6,857,071 B1* | 2/2005 | Nakae ......................... 713/156 |
| 6,874,086 B1 | 3/2005 | Gu et al. |
| 6,993,652 B2* | 1/2006 | Medvinsky .................. 713/155 |
| 6,996,631 B1 | 2/2006 | Aiken et al. |
| 7,010,300 B1 | 3/2006 | Jones et al. |
| 7,042,879 B2 | 5/2006 | Eschbach et al. |
| 7,113,994 B1* | 9/2006 | Swift et al. .................. 709/229 |
| 7,181,620 B1* | 2/2007 | Hur ............................. 713/171 |
| 7,212,962 B2 | 5/2007 | Masushige et al. |
| 7,287,156 B2* | 10/2007 | McGarvey ................... 713/153 |
| 7,315,948 B1* | 1/2008 | Peyravian et al. ........... 713/178 |
| 7,322,040 B1* | 1/2008 | Olson et al. ..................... 726/8 |
| 2001/0000358 A1 | 4/2001 | Isomichi et al. |
| 2001/0037464 A1 | 11/2001 | Persels |
| 2001/0056547 A1 | 12/2001 | Dixon ......................... 713/200 |
| 2002/0010866 A1 | 1/2002 | McCullough et al. |
| 2002/0029340 A1 | 3/2002 | Pensak et al. |
| 2002/0035699 A1 | 3/2002 | Crosbie |
| 2002/0098840 A1 | 7/2002 | Hanson et al. |
| 2002/0115407 A1 | 8/2002 | Thompson et al. |
| 2002/0116642 A1* | 8/2002 | Joshi et al. ................... 713/201 |
| 2002/0142774 A1 | 10/2002 | Saint-Hilaire et al. |
| 2002/0150253 A1* | 10/2002 | Brezak et al. ................ 380/281 |
| 2002/0164952 A1 | 11/2002 | Singhal et al. |
| 2002/0165990 A1 | 11/2002 | Singhal et al. |
| 2002/0178211 A1 | 11/2002 | Singhal et al. |
| 2002/0194473 A1 | 12/2002 | Pope et al. |
| 2003/0018913 A1* | 1/2003 | Brezak et al. ................ 713/201 |
| 2003/0043844 A1 | 3/2003 | Heller |
| 2003/0069803 A1 | 4/2003 | Pollitt |
| 2003/0078983 A1 | 4/2003 | Sullivan et al. |
| 2003/0078985 A1 | 4/2003 | Holbrook et al. |
| 2003/0084165 A1 | 5/2003 | Kjellberg et al. |
| 2003/0093691 A1 | 5/2003 | Simon et al. |
| 2003/0117992 A1 | 6/2003 | Kim et al. |
| 2003/0120811 A1 | 6/2003 | Hanson et al. |
| 2003/0163569 A1 | 8/2003 | Pansyuk et al. |
| 2003/0233554 A1* | 12/2003 | Litai et al. ................... 713/182 |
| 2005/0002417 A1 | 1/2005 | Kelly et al. |
| 2005/0015507 A1 | 1/2005 | Chin |
| 2005/0120248 A1* | 6/2005 | Medvinsky .................. 713/201 |
| 2005/0144186 A1 | 6/2005 | Hesselink et al. |
| 2005/0149481 A1 | 7/2005 | Hesselink et al. |
| 2005/0220086 A1 | 10/2005 | Dowling |
| 2005/0286466 A1 | 12/2005 | Tagg et al. |

FOREIGN PATENT DOCUMENTS

| | | | |
|---|---|---|---|
| EP | 0 483 547 | A1 | 5/1992 |
| EP | 0 483 551 | B1 | 5/1992 |
| EP | 0 575 765 | A1 | 12/1993 |
| EP | 0 575 765 | B1 | 12/1993 |
| EP | 0 643 514 | A2 | 3/1995 |
| EP | 0 679 980 | A1 | 11/1995 |
| EP | 0 679 980 | B1 | 11/1995 |
| EP | 0 734 144 | A2 | 9/1996 |
| EP | 0 851 628 | A1 | 7/1998 |
| EP | 1 351 467 | A2 | 10/2003 |
| GB | 2 168 831 | A | 6/1986 |
| JP | 2000-125029 | A | 4/2000 |
| WO | WO 92/19059 | | 10/1992 |
| WO | WO 94/14114 | | 11/1993 |
| WO | WO 94/28670 | | 12/1994 |
| WO | WO-97/18635 | | 5/1997 |
| WO | WO 97/18635 | | 5/1997 |
| WO | WO 98/52344 | | 11/1998 |
| WO | WO 99/66675 | | 12/1999 |
| WO | WO 99/66762 | | 12/1999 |
| WO | WO-00/72506 | A1 | 11/2000 |
| WO | WO 00/72506 | A1 | 11/2000 |
| WO | WO-01/15377 | | 3/2001 |
| WO | WO-01/74026 | | 10/2001 |
| WO | WO 02/23362 | A1 | 3/2002 |

OTHER PUBLICATIONS

Maxemchuk, "The Use of Communications Networks to Increase Personal Privacy," *IEEE Infocom '95, The Conference on Computer Communications*, vol. 2, Apr. 2-6, 1995, Boston, MA, pp. 504-512.
Ryan et al. "An attack on a recursive authentication protocol A cautionary tale," *Information Processing Letters*, 65 (1998), pp. 7-10.
Otway et al., "Efficient and Timely Mutual Authentication," The ANSA Project, 24 Hills Road, Cambridge, CB2 1JP, UK, (ansa%alvey.uk@cs.uci.sc.uk), pp. 8-9.
Paulson, "Mechanized Proofs for a Recursive Authentication Protocol," *1997 IEEE*, pp. 84-94.
Gong, "Using One-Way Functions for Authentication," University of Cambridge Computer Laboratory, Cambridge CB2 3QG, England, (lg@cl.cam.ac.uk), Jul. 1989, pp. 8-11.
"Network Neighborhood," http://webopedia.internet.com/TERM/N/Network_Neighborhood.html, printed Dec. 27, 1999, 2 pgs.
"Win95 Tutorial," http://orion.valencia.cc.fl.us/tutorials/Win95demo/, printed Dec. 27, 1999, 2 pgs.
Nicholson, "How to hold mobile users to account," *Financial Times*, Tues., May 2, 2000, 3 pgs.
Savvas, "Handset giants launch security system," www.computerweekly.com, 1 pg.
Seife, "Algorithmic Gladiators Vie for Digital Glory," www.sciencemag.org, *Science*, vol. 288, May 19, 2000, pp. 1161 and 1163.
Kay, "Authentication." *Computerworld*, Mar. 27, 2000, pp. 77.
Millman, "Give Your Computer the Finger," *Computerwold*, Mar. 27, 2000, 1 pg.
Allison et al., "File System Security: Secure Network Data Sharing for NT and UNIX," © 2000 Network Appliance, Inc., 8 pgs.
Yager, "OS Paradise," *Byte*, Nov. 1995, pp. 81-82, 84, 86, 89, 92, 95-96, 98.
Neuman, "Proxy-Based Authorization and Accounting for Distributed Systems," *1993 IEEE*, May 25, 1993, pp. 283-291.
IBM Operating System/2 Version 1.2 Profile Validation Hooks, Nov. 22, 1989, © International Business Machines Corporation 1989. pp. 1-26.
International Search Report for PCT/US03/05475 (4 pgs.).
Alexander, S. et al. "DHCP Optiona and BOOTP Vendor Extensions." Retrieved from the internet at http://www.ietf.org/rfc/rfc2132.txt?number=2132, 29 pp. Mar. 1997.
Bakre, A. et al. "I-TCP: Indirect TCP for Mobile Hosts." Document DCS-TR-314, pp. 1-18, Rutgers University, Piscataway, New Jeersey, Oct. 1994.

Berners-Lee, T. et al. "Hypertext Transfer Protocol—HTTP/1.0." downloaded from the internet at http://www.w3.org/Protocols/rfc1945/rfc1945, pp. 1-60, May 1996.

Datability Software Systems, Inc. "Proposal Presented to Digital Equipment Corporation Large Systems Group" Marlborough, MA, Jul. 7, 1983, pp. 1-13.

Droms, R. "Dynamic Host Configuration Protocol" retrieved from the internet at http://www.ietf.org/rfc/rfc2131.txt?number=2131, pp. 1-38, 1997.

Information Sciences Institute "Transmission Control Protocol: DARPA Internet Program Protocol Specification." 85 pp. 1981.

International Business Machines Corporation "ARTour." 4 pp. 1995.

International Search Report to PCT/US2002/018295 (Nov. 7, 2002), 3 pages.

International Search Report to PCT/US2003/005475 (Aug. 6, 2003), 2 pages.

International Search Report to PCT/US2004/0333333 (Jan. 17, 2005), 7 pages.

International Search Report for PCT/US2004/033794 (Jan. 20, 2005) 8 pages.

International Search Report to PCT/US2004/033334 (Jan. 5, 2005), 7 pages.

Ioannidis, J. et al., "IP-based Protocols for Mobile Internetworking" In Proceedings of the ACM SIGCOMM Symposium on Communications, Architectures and Protocols, pp. 235-245, Sep. 1991.

Ioannidis, J. et al., "Protocols for Supporting Mobile IP Hosts." Internet Draft, retrieval address unknown, 48 pp., Jun. 1992.

Kiiskinen, J., et al., "Data Channel Service for Wireless Telephone Links." Publication C-1996-1, pp. 1-17, University of Helsinki, Department of Computer Science, Helsinki, 1994.

Kojo, M. et al., "Connecting Mobile Workstations to the Internet Over a Digital Cellular Telephone Network." Publication C-1994-39, pp. 1-16, University of Helsinki, Department of Computer Science, Helsinki, 1994.

Kojo, M., et al., "Enhanced Communication Services for Mobile TCP/IP Networking." Publication C-1995-15, pp. 1-22, University of Helsinki, Department of Computer Science, Helsinki, 1995.

Laamanen, Heimo, "An Experiment of Dependability and Performance of GSM Access to Fixed Data Network." Publication C-1995-41, pp. 1-21, University of Helsinki, Department of Computer Science, Helsinki, 1995.

Liljeberg, M., et al., "Enhanced Services for World-Wide Web in Mobile WAN Environment." Publication C-1996-28, pp. 1-12, University of Helsinki, Department of Computer Science, Helsinki, 1996.

Liljeberg, M., et al. "Optimizing World-Wide Web for Weakly Connected Mobile Workstations: An Indirect Approach" pp. 1-8., in Proc. 2nd International Workshop on Services in Distributed and Netwroked Environments (SDNE), Whistler, Canada, Jun. 1995.

M3I Systems, Inc., "M3i RadioLink (management through instant interactive information): Overview" 7pp., 1995.

Maltz, David A., "MSOCKS: an architecture for transport layer mobility," 9pp., in Proceedings of the IEEE INFOCOM '98, 1998.

Milligan, T. "iiif, The Integrated Interactive Intermedia Facility Design Report—CAVECAT Revision 1.2.2." 22pp., Dynamic Graphics Project, University of Toronto, Toronto, 1991.

NetMotion Wireless, "NetMotion Wireless Product Documentation" 3pp. retrieved from the internet at www.netmotionwireless.com/support/manuals, 2002.

Nodes Group, "MOWGLI: Mobile Office Workstations using GSM Links" 3pp., retrieved from the internet at http://www.cs.helsinki.fi/research/mowgli, 2002.

PADCom, Inc. "Connectivity Suite Technical Overview." pp. i-11, 1-40, PADCom, Inc., Bethlehem, PA, 2001.

Pankoke-Babatz, U. "1984/1998 X.400 Recommendations—user requirements." Computer Science Communications 13(10):595-610, 1990.

Perkins, C.E., et al. "DHCP for Mobile Networking with TCP/IP." IEEE Symposium on Computers and COmmunications, p. 255-61, 1995.

Perkins, C.E. "Mobile Networking Through Mobile IP." 15pp., retrieved from the internet at www.computer.org/internet/v2n1/perkins.htm, Internet Computing Online, 1997.

Piscitello, D. et al. "Mobile Network Computing Protocol (MNCP)." 28 pp. retrieved from the internet at http://tools.ietf.org/html/draft-piscitello-mncp-00, 1997.

TEKnique "Optimized TCP/IP Over Wireless." 5pp. (Publication Date unknown).

TEKnique "TransNet II Wireless Gateway Services." 2 pp. (publication date unknown).

TEKnique "TransNet II Wireless Gateway." 3pp. (publication date unknown).

TEKnique "TransRMail." 2pp. (publication date unknown).

TEKnique "TX1000." 2pp., 1994.

TEKnique "TX2000." 2pp. (publication date unknown).

TEKnique "TX5000." 2pp. 1994.

Teraoka, F. et al. "A Network Architecture Providing Host Migration Transparency." In Proceedings of the ACM SIGCOMM Symposium on Communications, Architectures and Protocols, pp. 209-220, Sep. 1991.

Weiser, M. "Some Computer Science Issues in Ubiquitous Computing." pp. 75-85, Communications of the ACM, Jul. 1993.

Written Opinion of the International Searching Authority to PCT/US2003/018295 (Aug. 22, 2003) 5 pages.

Written Opinion of the International Searching Authority to PCT/US2004/0033794 (Oct. 12, 2004) 6 pages.

Written Opinion of the International Searching Authority to PCT/US2004/033333 (Oct. 8, 2004) 7 pages.

Written Opinion of the International Searching Authority to PCT/US2004/033334 (Oct. 8, 2004) 5 pages.

WRQ, Inc. "AtGuard Getting Started Guide" 6pp. Retreived from the internet at http://www.atguard.com/help/docs/guide.html (publication date unknown).

WRQ, Inc. "Glossary." 8pp. Retreived from the internet at http://www.atguard.com/product_info/features.html (publication date unknown).

WRQ, Inc. "WRQ Licenses AtGuard to Symantec and ASCII Network Technology." 1 page, retrieved from the internet at http://www.atguard.com/press_area/Welcome.html, 1999.

WRQ, Inc. "Tour of AtGuard's Features." 8pp. retrieved from the internet at http://www.atguard.com/product_info/features.html (publication date unknown).

Non Final Office Action. U.S. Appl. No. 09/880,268, filed Oct. 20, 2005.

Non Final Office Action. U.S. Appl. No. 10/683,881, filed Dec. 11, 2007.

Non Final Office Action. U.S. Appl. No. 11/157,289, filed Jun. 11, 2008.

Non Final Office Action. U.S. Appl. No. 11/158,156, filed Jun. 6, 2008.

Non Final Office Action. U.S. Appl. No. 11/157,315, filed Mar. 28, 2006.

Supplemental European Search Report related to European Patent Application No. 03743203.6 dated Nov. 14, 2008.

Alanko, T., et al., "Measured Performance of Data Transmission Over Cellular Telephone Networks." Report C-1994-53, Department of Computer Science, University of Helsinki, Nov. 1994. pp. 1-20.

Ioannidis, J., et al., "The Design and Implementation of a Mobile Internetworking Architecture" 1993 Winter USENIX, Jan. 1993. pp. 491-502.

Montenegro, G., "Reverse Tunneling for Mobile IP, revised." Retrieved from the internet at http://www.ietf.org/rfc/rfc3024.txt, Jan. 2001. pp. 1-30.

Postel, J., et al. "File Transfer Protocol (FTP)." IETF RFC 765, Oct. 1985. pp. 1-68.

Sun Microsystems, Inc. "RPC: Remote Procedure Call Protocol Specification Version 2." IETF RFC 1050, Jun. 1998. pp. 1-25.

* cited by examiner

SECURE TRAVERSAL OF NETWORK COMPONENTS

FIELD OF THE INVENTION

The present invention relates generally to traversing network components and, more specifically, to providing secure, authenticated traversal of arbitrary network components using next-hop routing and per-hop tickets.

BACKGROUND OF THE INVENTION

Referring to FIG. 1, a computer system 100 known to the prior art typically includes a client computer 110, a content server proxy 115, and a content server 120. The client computer 110 is typically a personal computer that can download information from the content server 120 over a network 130, such as the Internet or World Wide Web. The content server proxy 115 is typically a security gateway, such as a router, through which messages to and from the content server 120 pass. The content server 120 hosts one or more application programs that can be accessed by the client 110.

The client 110 is typically in communication with the content server proxy 115 over a client-proxy communication channel 135. The content server proxy 115 is typically in communication with the content server 120 over a proxy-server communication channel 145. The computer system 100 also typically includes firewalls 150, 160 to prohibit unauthorized communication to/from the content server 120.

The client 110 typically gains access to the content server 120 after passing through the firewall 150 of the content server proxy 115 and the firewall 160 of the content server 120. Thus, if an unauthorized user bypasses the content server proxy 115 and the firewall 160 (that is, if an unauthorized user is able to connect to the content server 120 without first accessing the content server proxy 115) the unauthorized user can typically access the content server 120 without encountering additional security. Further, a malicious user breaching firewall 150 typically has unrestrained access to the content server proxy 115 and, in many cases, to content server 120.

Therefore, there is a need to increase the protection of a content server 120 from an unauthorized user. There is also a need to enforce network routing requiring the client 110 to pass through one or more additional security measures before gaining access to the content server 120.

SUMMARY OF THE INVENTION

The present invention relates to a method and system for authenticating a client to a content server. In one aspect, the method includes the step of generating a ticket, by a ticket authority, associated with the client. The ticket comprises a first ticket and a second ticket. The method also includes the steps of transmitting the first ticket to the client and the client using the first ticket to establish a communication session with a content server proxy. The method also includes the steps of transmitting the second ticket to the content server proxy and the content server proxy using the second ticket to establish a communication session with the content server.

In one embodiment, the client is authenticated to a web server before the ticket authority generates the ticket associated with the client. The method may also include the step of transmitting the first ticket to a web server and the web server transmitting the first ticket to the client. In another embodiment, the ticket authority transmits a disabled second ticket with the first ticket to the client. The ticket authority can also transmit the address of a content server with the transmission of the second ticket to the content server proxy.

In another aspect, the system includes a client, a ticket authority, a content server, and a content server proxy. The content server proxy communicates with the client, the ticket authority, and the content server. The ticket authority generates a ticket associated with the client. The ticket comprises a first ticket and a second ticket. The first ticket is transmitted to the client and used to establish a first communication session with the content server proxy. The second ticket is transmitted to the content server proxy and used to establish a second communication session with the content server.

In one embodiment, the client is authenticated to a web server. The ticket authority can also transmit the second ticket to the web server and the web server transmits the second ticket to the content server for validation. In one embodiment, the content server proxy is a secure socket layer relay.

BRIEF DESCRIPTION OF THE DRAWINGS

The advantages of the invention described above, together with further advantages, may be better understood by referring to the following description taken in conjunction with the accompanying drawings. In the drawings, like reference characters generally refer to the same parts throughout the different views. Also, the drawings are not necessarily to scale, emphasis instead generally being placed upon illustrating the principles of the invention.

DETAILED DESCRIPTION OF THE INVENTION

Figure 1:
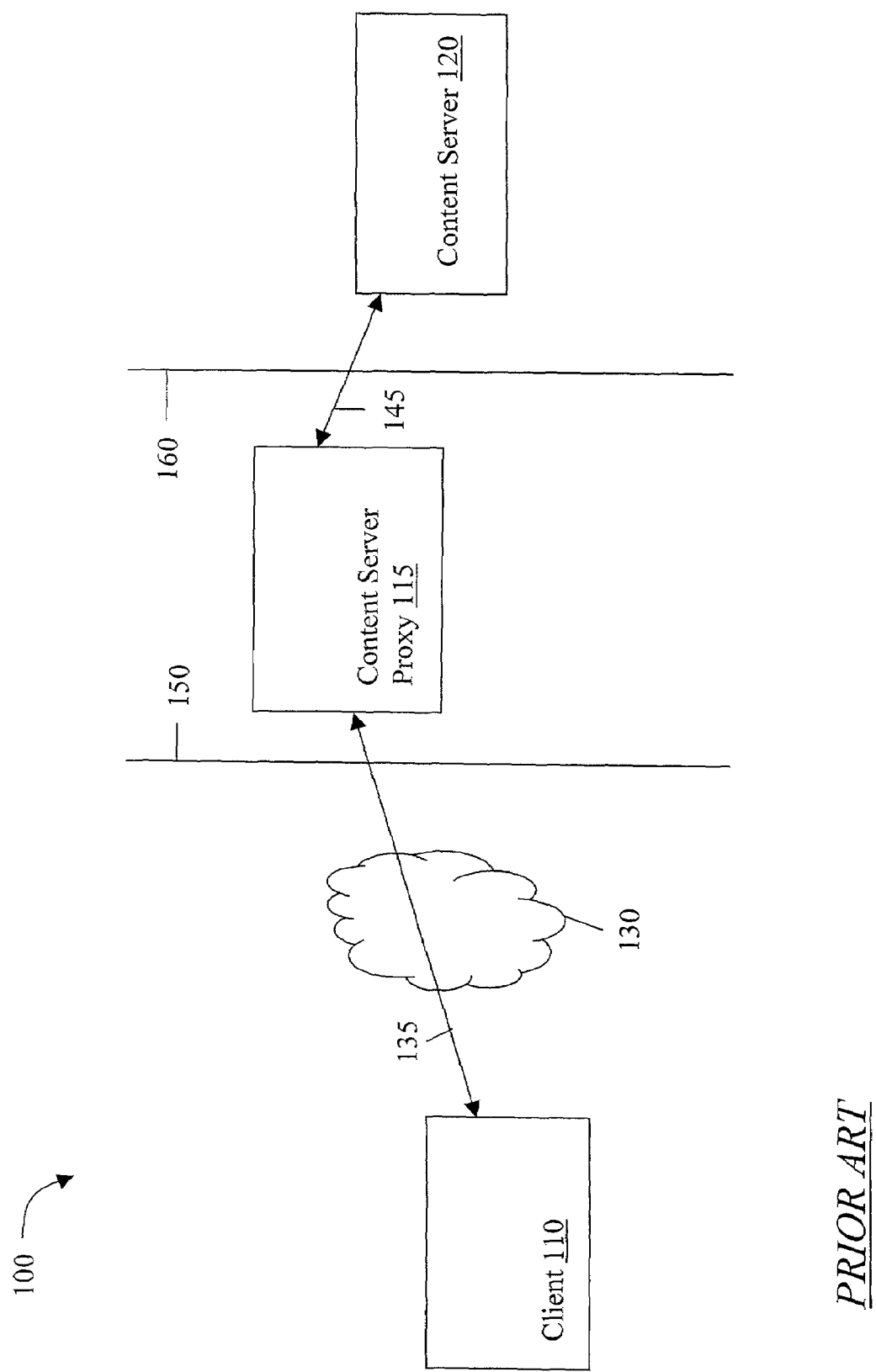
FIG. 1 is a block diagram of an embodiment of a prior art communications system.
Figure 2A:
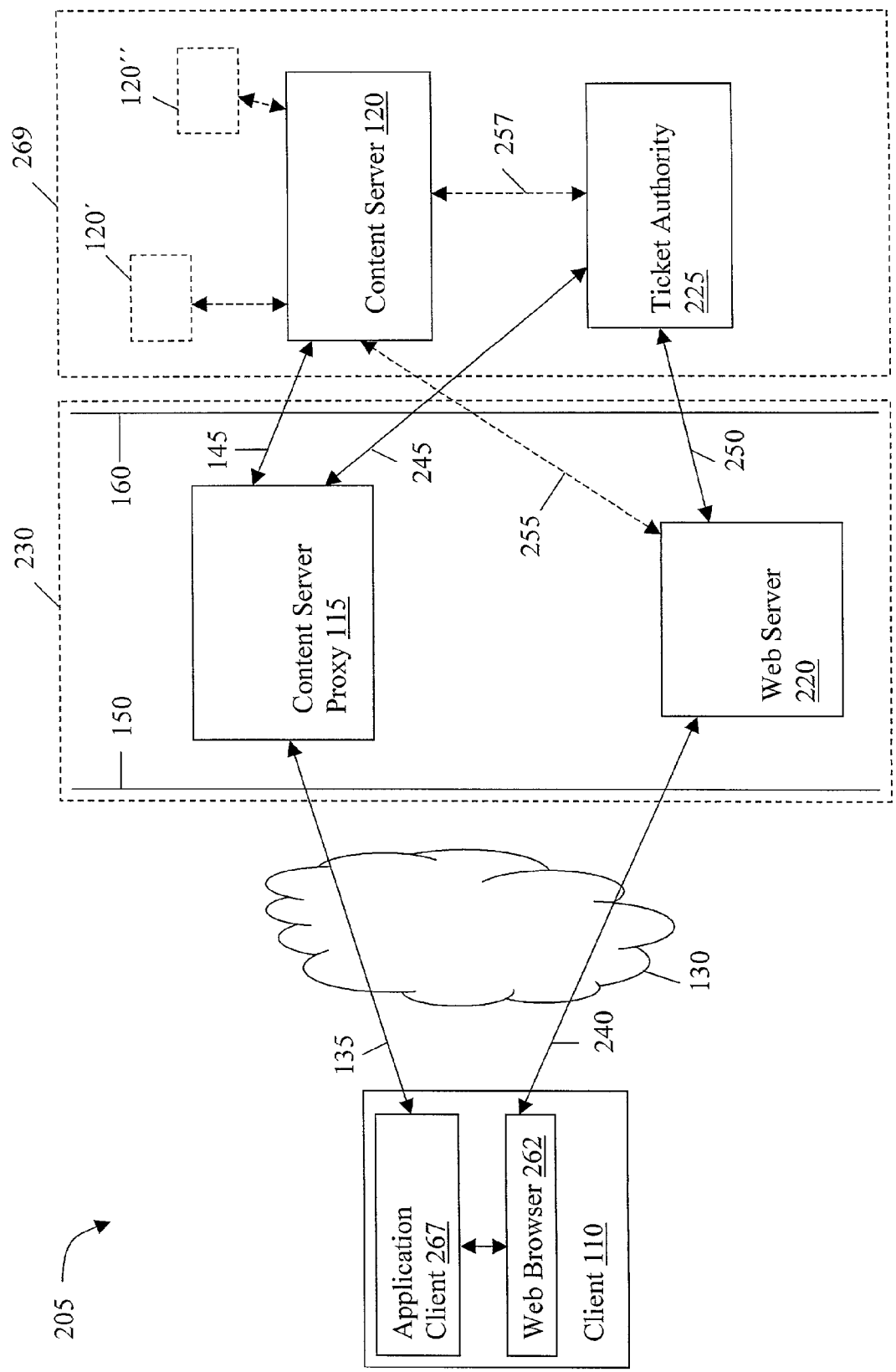
FIG. 2A is a block diagram of an embodiment of a communications system constructed in accordance with the invention.

FIG. 2A shows a block diagram of an embodiment of a communications system 205 for secure delivery of content. The communications system 205 includes the client 10, the content server proxy 115, the content server 120, a web server 220, and a ticket authority 225. The communications system 205 also includes the two firewalls 150, 160 which prohibit unauthorized communications to/from the content server 120. The network between the firewalls 150, 160 is often referred to as a "demilitarized zone," (DMZ) 230. In one embodiment, the DMZ 230 includes the content server proxy 115 and the web server 220.

The client 110 can be any personal computer (e.g., based on a microprocessor from the x86, 680x0, PowerPC, PA-RISC, MIPS families), smart or dumb terminal, network computer, wireless device, information appliance, workstation, minicomputer, mainframe computer or other computing device that has a graphical user interface. Operating systems supported by the client 110 can include any member of the WINDOWS family of operating systems from Microsoft Corporation of Redmond, Wash., Macintosh operating system, JavaOS, and various varieties of Unix (e.g., Solaris, SunOS, Linux, HP-UX, A/IX, and BSD-based distributions).

The client 110 is in communication with the content server proxy 115 over the client-proxy communication channel 135 and also in communication with the web server 220 over the client-web server communication channel 240. The content server proxy 115 is in communication with the ticket authority 225 over a proxy-authority communication channel 245 and the web server 220 is in communication with the ticket authority 225 over a web server-authority communication channel 250. The content server proxy 115 is also in communication with the content server 120 over a proxy-server communication channel 145. In another embodiment, the web server 220 can communicate with the content server 120 over an agent-server communication channel 255. Similarly, the content server 120 can communicate with the ticket authority 225 over a ticket-content server communication channel 257. In one embodiment, the respective communication channels 135, 145, 240, 245, 250, 255, 257 are established over the network 130.

In one embodiment, the client 110 includes a web browser 262, such as INTERNET EXPLORER developed by Microsoft Corporation in Redmond, Wash., to connect to the web. In a further embodiment, the web browser 262 uses the existing Secure Socket Layer (SSL) support to establish the secure client-web server communication channel 240 to the web server 220. SSL is a secure protocol developed by Netscape Communication Corporation of Mountain View, California, and is now a standard promulgated by the Internet Engineering Task Force (IETF).

The client 110 may also include an application client 267 for establishing and exchanging communications with the content server 120 over the client-proxy communication channel 135. In one embodiment, the application client 267 is an ICA client, developed by Citrix Systems, Inc. of Fort Lauderdale, Fla., and is hereafter referred to as ICA client 267. Other embodiments of the application client 267 include an RDP client, developed by Microsoft Corporation of Redmond, Wash., a data entry client in a traditional client/server application, an ActiveX control, or a Java applet. Moreover, the output of an application executing on the content server 120 can be displayed at the client 110 via, for example, the application client 267 or the web browser 262.

In one embodiment, the content server proxy 115 is a security gateway through which messages over the client-proxy communication channel 135 must pass. In one embodiment, the network firewall 150 repudiates any incoming message from the client-proxy communication channel 135 that does not have the content server proxy 115 as its destination. Likewise, the network firewall 150 repudiates any outgoing message for the client-proxy communication channel 135 unless its source is the content server proxy 115. Although illustrated as a content server proxy 115, the security gateway can alternatively be a router, firewall, relay, or any network component that can provide the necessary security.

The content server 120 hosts one or more application programs that are available to the client 110. Applications made available to the client 110 for use are referred to as published applications. Examples of such applications include word processing programs such as MICROSOFT WORD and spreadsheet programs such as MICROSOFT EXCEL, both manufactured by Microsoft Corporation of Redmond, Wash., financial reporting programs, customer registration programs, programs providing technical support information, customer database applications, or application set managers.

In one embodiment, the content server 120 is a video/audio streaming server that can provide streaming audio and/or streaming video to the client 110. In another embodiment, the content server 120 is a file server that can provide any/all file types to the client 110. In further embodiments, the content server 120 can communicate with the client 110 using a presentation protocol such as ICA, from Citrix Systems, Inc. of Ft. Lauderdale, FL or RDP, from Microsoft Corporation of Redmond, Wash.

In a further embodiment, the content server 120 is a member of a server farm 269, or server network, which is a logical group of one or more servers that are administered as a single entity. In one embodiment, a server farm 269 includes multiple content servers 120, 120', 120" (generally 120). Although the embodiment shown in FIG. 2A has three content servers 120, the server farm 269 can have any number of servers. In other embodiments, the server farm 269 is a protected network that is inaccessible by unauthorized individuals, such as corporate Intranet, Virtual Private Network (VPN), or secure extranet. Additionally, the servers making up the server farm 269 may communicate over any of the networks described above (e.g., WAN, LAN) using any of the protocols discussed.

The ticket authority 225, which in the embodiment shown in FIG. 2A is part of the server farm 269, issues one or more tickets to authenticate the client 110. In particular, the ticket authority 225 enables authentication of the client 110 over one communication channel (i.e., the client-web server communication channel 240) based on authentication credentials. The ticket authority 225 further enables the client 110 to be authenticated to another communication channel (i.e., client-proxy communication channel 135) without having the client 110 repeatedly provide authentication credentials on the other communication channel.

Figure 2B:
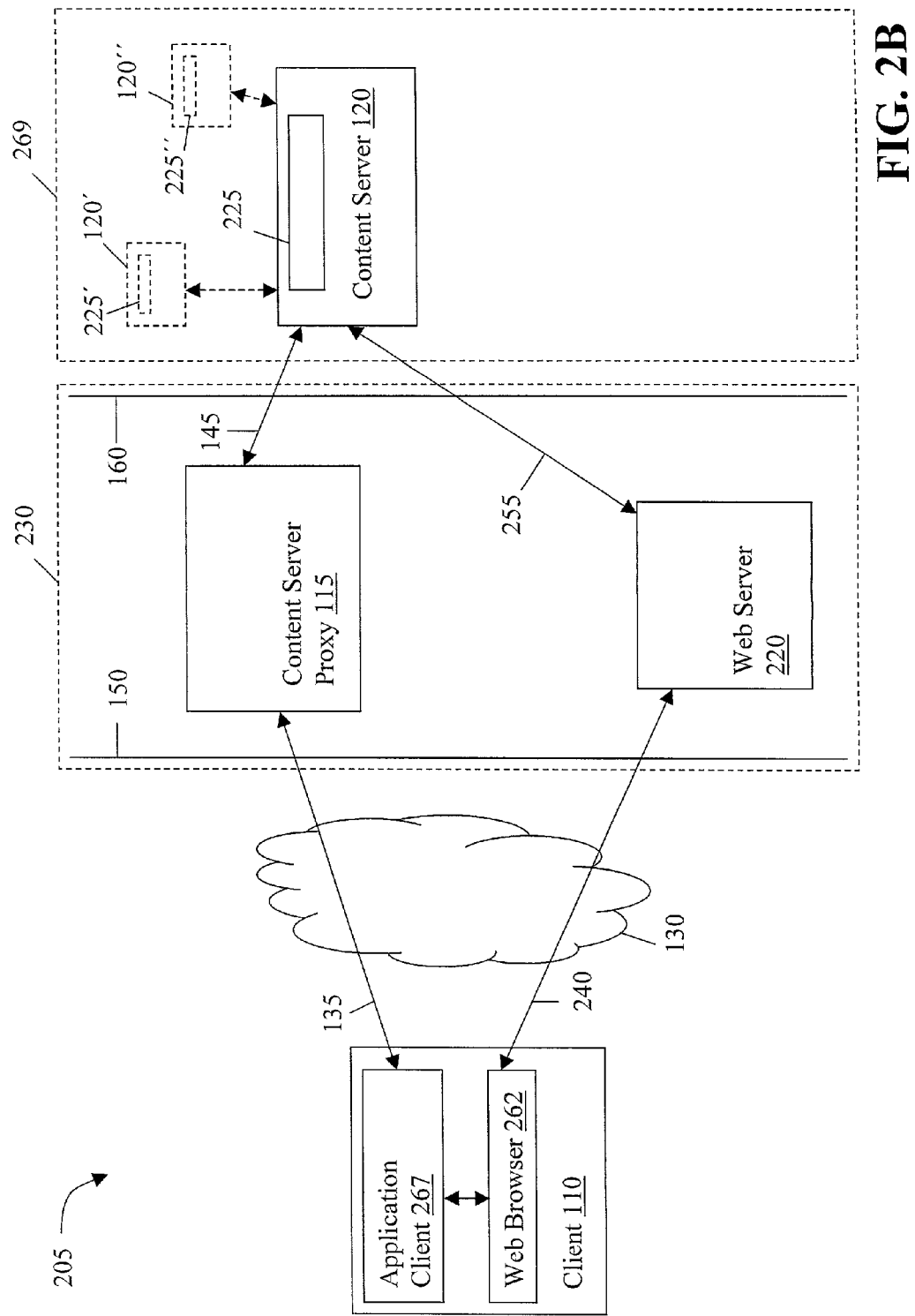
FIG. 2B is a block diagram of another embodiment of a communications system constructed in accordance with the invention.

In one embodiment, the ticket authority 225 is a stand-alone network component. In other embodiments and as shown in FIG. 2B, a modular ticket authority 225, 225', 225" is a software module residing on one or more content servers 120. In this embodiment, the web server 220 may communicate with the ticket authority 225 and/or the content server 120 over the agent-server communication channel 255.

In one embodiment, the ticket authority 225 generates a first ticket and a second ticket. In some embodiments, the tickets are both nonces. In further embodiments, the tickets are generated using a cryptographic random number generator that has been suitably seeded with randomness. The first ticket is transmitted to the client 110 and is used to establish a first communication session between the client 110 and the content server proxy 115. The second ticket is transmitted to the content server proxy 115 and is used to establish a second communication session between the content server proxy 115 and the content server 120.

The DMZ 230 separates the server farm 269 from the components (e.g., content server proxy 115) of the communications system 205 that are accessible by unauthorized individuals. As described above, the DMZ 230 is delineated with two firewalls 150, 160 that prohibit unauthorized communication. The first firewall 150 and the second firewall 160 each apply a set of policy rules to determine which messages can traverse the DMZ 230. In one embodiment, the first firewall 150 and the second firewall 160 apply the same set of policy rules. Alternatively, the first firewall 150 and the second firewall 160 may apply different sets of policy rules. Each firewall 150, 160 can be a router, computer, or any other network access control device. In another embodiment, the communications systems 205 includes one of the firewalls 150, 160 or no firewall 150, 160.

In one embodiment, the web server 220 delivers web pages to the client 110. The web server 220 can be any personal computer (e.g., Macintosh computer, a personal computer having an Intel microprocessor, developed by Intel Corporation of Santa Clara, Calif., a personal computer having an AMD microprocessor, developed by Advanced Micro Devices, Inc. of Sunnyvale, Calif., etc.), Windows-based terminal, Network Computer, wireless device (e.g., cellular phone), information appliance, RISC Power PC, X-device, workstation, mini computer, main frame computer, personal digital assistant, or other communications device that is capable of establishing the secure client-web server communication channel 240 with the client 110.

In another embodiment, the web server 220 provides a corporate portal, also referred to as an Enterprise Information Portal, to the client 110. Enterprise portals are company web sites that aggregate, personalize and serve applications, data and content to users, while offering management tools for organizing and using information more efficiently. In other embodiments, the web server 220 provides a web portal, or Internet portal, to the client 110. A web portal is similar to a corporate portal but typically does not include business-specific information.

The network 130 can be a local-area network (LAN), a wide area network (WAN), or a network of networks such as the Internet or the World Wide Web (i.e., web). The respective communication channels 135, 145, 240, 245, 250, 255, 257 may each be part of different networks. For example, the client-proxy communication channel 135 can belong to a first network (e.g., the World Wide Web) and the client-web server communication channel 240 can belong to a second network (e.g., a secured extranet or Virtual Private Network (VPN)). In other embodiments, the network 130 spans the DMZ 230 as well as the server farm 269 and the same communication protocol is used throughout. In some embodiments, no firewall 160 separates the content server proxy 115 and web server 220 from the content server 120 and ticket authority 225.

The client-web server communication channel 240 is any secure communication channel. In some embodiments, communications over channel 240 are encrypted. In certain of these embodiments, the client 110 and the web server 220 may communicate using the Secure Socket Layer (SSL) of the HyperText Transfer Protocol (HTTPS). Alternatively, the client 110 and the web server 220 may use other encryption techniques, such as symmetric encryption techniques, to protect communications.

Example embodiments of the communication channels 135, 145, 240, 245, 250, 255, 257 include standard telephone lines, LAN or WAN links (e.g., T1, T3, 56kb, X.25), broadband connections (ISDN, Frame Relay, ATM), and wireless connections. The connections over the communication channels 135, 145, 240, 245, 250, 255, 257 can be established using a variety of communication protocols (e.g., HTTP, HTTPS, TCP/IP, IPX, SPX, NetBIOS, Ethernet, RS232, messaging application programming interface (MAPI) protocol, real-time streaming protocol (RTSP), real-time streaming protocol used for user datagram protocol scheme (RTSPU), the Progressive Networks Multimedia (PNM) protocol developed by RealNetworks, Inc. of Seattle, Wash., manufacturing message specification (MMS) protocol, and direct asynchronous connections).

Further, in one embodiment the client-proxy communication channel 135 can be established by using, for example, a presentation services protocol such as Independent Computing Architecture (ICA) protocol, manufactured by Citrix Systems, Inc. of Fort Lauderdale, Fla. ICA is a general-purpose presentation services protocol designed to run over industry standard network protocols, such as TCP/IP, IPX/SPX, NetBEUI, using industry-standard transport protocols, such as ISDN, frame relay, and asynchronous transfer mode (ATM). The ICA protocol provides for virtual channels, which are session-oriented transmission connections that can be used by application-layer code to issue commands for exchanging data. In other embodiments, the client-proxy communication channel 135 can be established using the thin X protocol or the Remote Display Protocol (RDP), developed by Microsoft Corporation of Redmond, Wash..

Although described as establishing a first communication session between the client 110 and the content server proxy 115 and a second communication session between the content server proxy 115 and the content server 120, the communication session can be viewed as a single, logical communication session between the client 110 and the content server 120.

In one embodiment, a user of the client 110 employs the web browser 262 to authenticate the user to the web server 220. In one embodiment, the client 110 transmits user credentials, such as login and password information, to the web server 220. The web server 220 verifies that the user has access to the server network 269.

In a further embodiment, the web browser 262 uses SSL to establish the secure client-web server communication channel 240. The web browser 262 can alternatively connect to the web server 220 over the client-web server communication channel 240 using other security protocols, such as, but not limited to, Secure Hypertext Transfer Protocol (SHTTP) developed by Terisa Systems of Los Altos, Calif., HTTP over SSL (HTTPS), Private Communication Technology (PCT) developed by Microsoft Corporation of Redmond, Wash., and the Transport Level Security (TLS) standard promulgated by the Internet Engineering Task Force (IETF).

In one embodiment, the web server 220 transmits a web portal or enterprise portal, as described above, to the client 110 upon validation of the user to enable the client 110 to request an application or a server desktop, for example, to be remotely displayed on the client 110.

Figure 3:
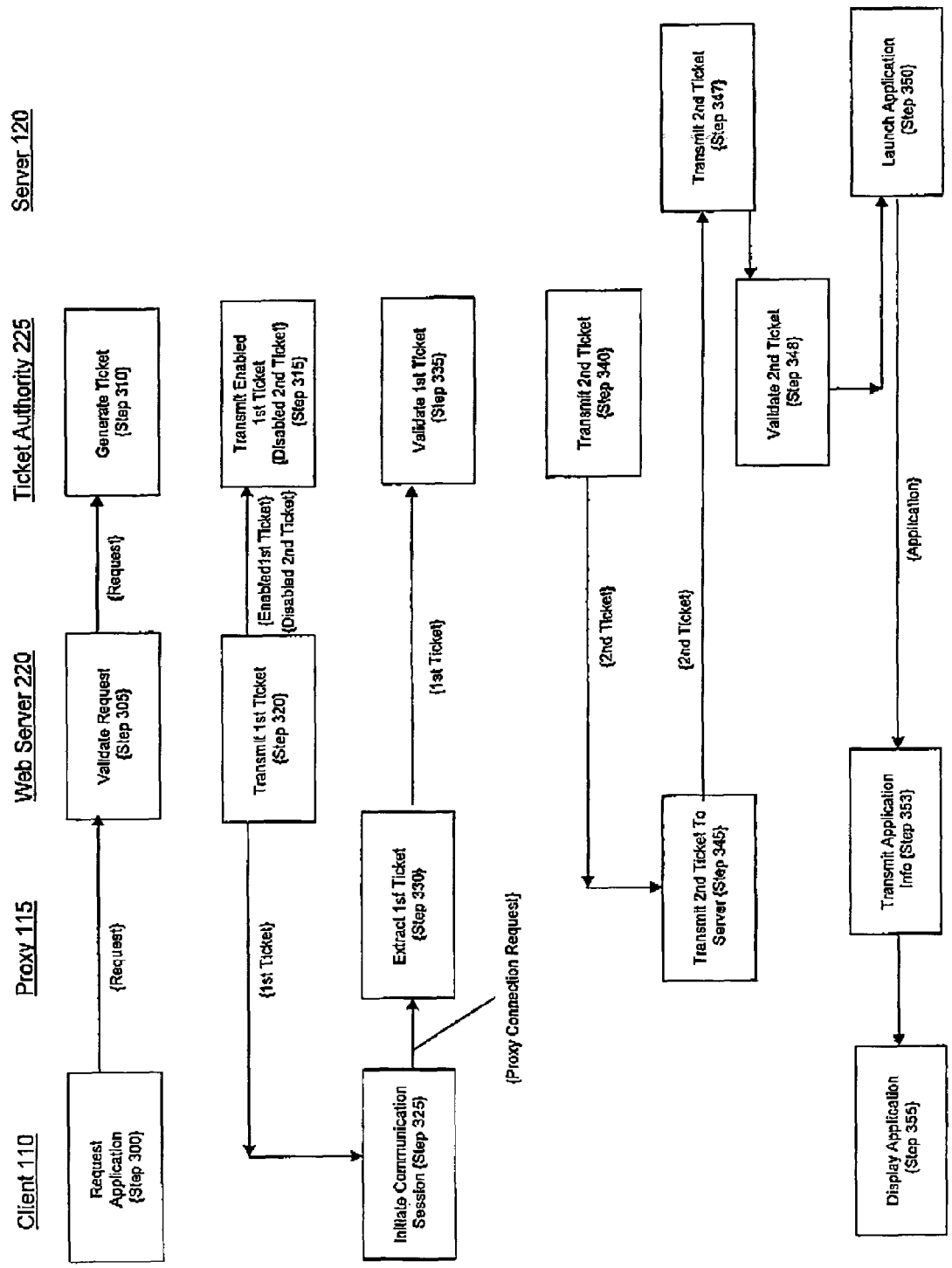
FIG. 3 is a flow diagram illustrating an embodiment of the operation of the communications system of FIG. 2A in accordance with the invention.

In operation, and also referring to FIG. 3, the client user requests (step 300) content (e.g., an application, a server desktop) to be remotely displayed on the client 110 (i.e., the ICA client 267). In another embodiment, the client 110 uses the web browser 262 to request an application and the web server 220 then authenticates the user. After receiving the request, the web server 220 validates (step 305) the request with the ticket authority 225. The ticket authority 225 then generates (step 310) a ticket, which includes a first ticket, or client ticket, and a second ticket, or content server proxy ticket. The first and second tickets are "one-time use" tickets having no further value after their first use. In a further embodiment, the first and second tickets must be used within a predetermined time period.

In one embodiment, the ticket authority 225 stores the first and second tickets in memory (e.g., RAM) until the ticket is used. Alternatively, the ticket authority 225 stores the first and second tickets in a storage device (not shown) until the ticket is used. The storage device may include, for example, a database or a persistent memory (e.g., on a floppy disk, hard disk drive). The ticket authority 225 subsequently transmits (step 315) the client ticket to the web server 220 and the web server 220 then forwards (step 320) the client ticket to the client 110.

The client 110 then initiates (step 325) a communication session with the content server proxy 115 by transmitting a proxy connection request over the client-proxy communication channel 135. The proxy connection request includes the client ticket. In one embodiment, the proxy connection request also includes a dummy password that can be replaced by the content server proxy 115 when establishing a communication session with the content server 120. In a further embodiment, the web server 220 transmits the dummy password to the client 110 for future generation of a proxy connection request having a format acceptable to the content server proxy 115. The content server proxy 115 then extricates (step 330) the client ticket from the proxy connection request and forwards the client ticket to the ticket authority 225 for validation. The ticket authority 225 then validates (step 335) the first ticket. In one embodiment, the ticket authority 225 verifies the first ticket by searching its storage device (e.g., database) for the first expected ticket.

If the ticket authority 225 does not find the first ticket in the storage device (such as if the first ticket has been used already), the ticket authority 225 ends the communication session. If the received ticket matches the client ticket that the ticket authority 225 expects, the client ticket is validated. The ticket authority 225 then transmits (step 340) the second or content server proxy ticket to the content server proxy 115. Additionally, the ticket authority 225 deletes the client ticket from the storage device, as the client ticket has now been used once. In another embodiment, the ticket authority 225 also transmits the Internet protocol (IP) address of the content server 120 to the content server proxy 115. In yet another embodiment, the ticket authority 225 transmits the domain name of the content server 120 to the content server proxy 115 for future conversion into the IP address.

The content server proxy 115 receives the second or content server proxy ticket and subsequently opens communications across the proxy-server communication channel 145 by transmitting (step 345) the second ticket to the content server 120. The content server 120 receives the content server proxy ticket and then transmits the ticket over the ticket-content server communication channel 98 to the ticket authority 255 for validation (step 347). In one embodiment, if the ticket authority 225 determines that the content server proxy ticket received from the content server 120 has been used previously or does not have the correct value (i.e., the same value as the value stored in the associated storage device), the ticket authority 225 transmits an error message to the content server proxy 115 (or the web server 220) to terminate the established communication session with the client 110. If the ticket authority 225 validates the content server proxy ticket (step 348), the content server 120 then launches (step 350) the ICA published application. The content server 120 then transmits application information to the content server proxy 115 (step 353) for remote displaying of the application on the client 110 (step 355) using the ICA client 267.

In a further embodiment, the client 110 launches the ICA client 267 when initiating communications with the content server proxy 115 in step 325. In other embodiments, the client 110 launches the ICA client 267 when the client 110 receives the application information from the content server proxy 115 in step 353.

Thus, the client 110 is not aware of the content server proxy ticket but only the client ticket. Moreover, the ICA client 267 cannot access the content server 120 without communicating with the content server proxy 115 (and presenting the client ticket).

The ticket authority 225 could also transmit the content server proxy ticket to the content server proxy 115 in step 340 as the user password for the user of the client 110. This allows the content server proxy 115 to use the content server proxy ticket as the login password to gain access to the content server 120 without exposing the user's login password over the untrusted part of the web (i.e., the non-secure client-proxy communication channel 135 during step 325). Thus, in one embodiment, the communications system 205 could include a centralized password mapping database managed by the ticket authority 225 and collocated with the content server 120 to map the content server proxy ticket with a user's password.

Therefore, the password can accompany both tickets (i.e., the content server proxy ticket and the client ticket) or the password can accompany one of the two tickets. As described above, if the password accompanies one of the two tickets, such as the client ticket, then the content server proxy ticket is the password. In one embodiment, the password can be a system password that does not change in value or may be a one-time use password, such as those generated by SecurID tokens developed by RSA Security Inc. of Bedford, Mass.

Additionally, the invention can be expanded to a communications system having any number of content server proxies 115, or "hops", that the client 110 has to communicate with before establishing a communication session with the content server 120. Although described above and below as a content server proxy 115, a hop can be any network component, such as a firewall, router, and relay.

Figure 4A:
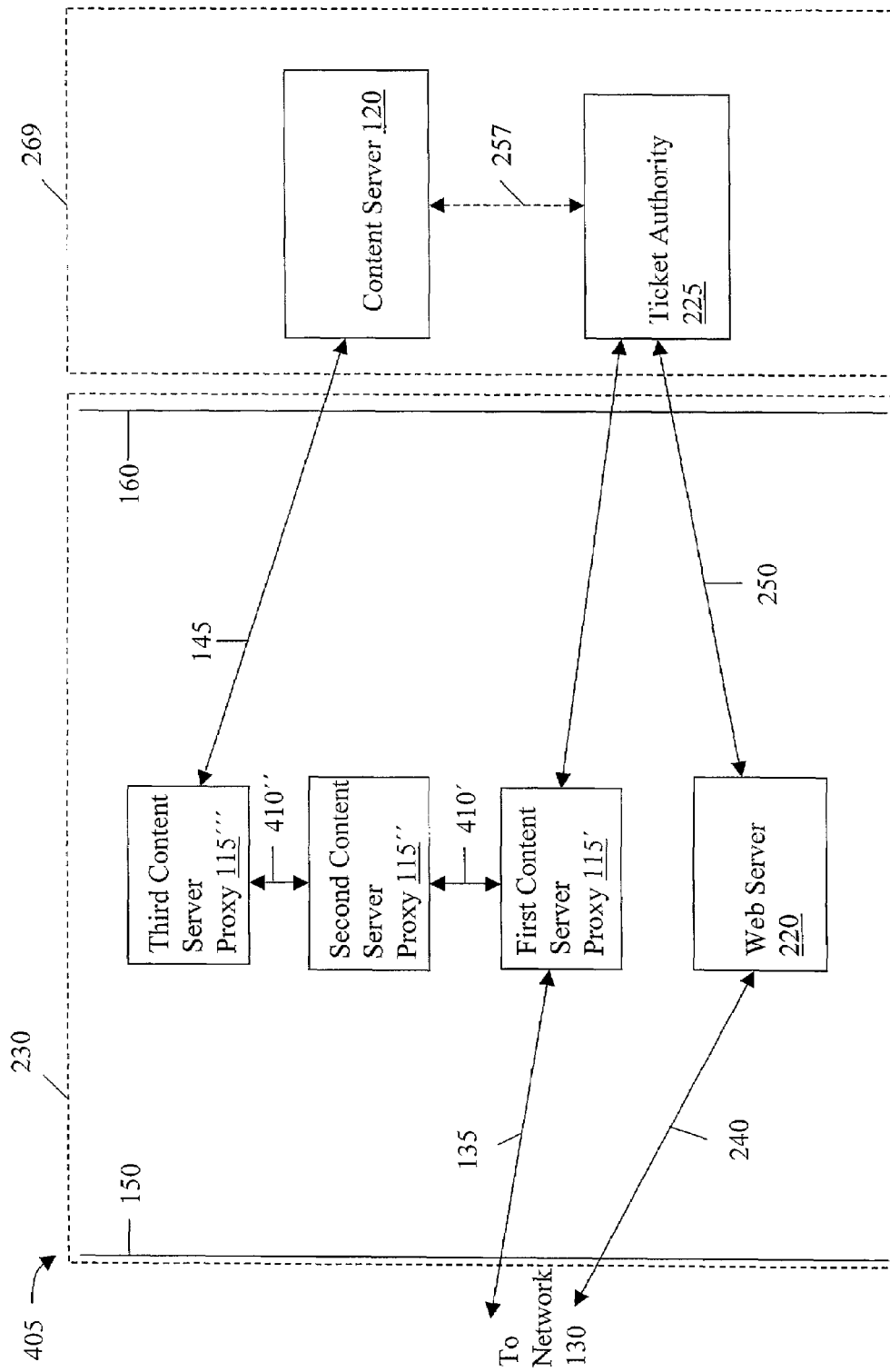
FIG. 4A is a block diagram of another embodiment of a communications system constructed in accordance with the invention.

For instance and referring to FIG. 4A, a four-hop example is a communication system 405 having a first content server proxy 115', a second content server proxy 115'', and a third content server proxy 115''' (generally 115). The content server proxies 115 communicate over a proxy-proxy communication channel, such as a first proxy-proxy communication channel 410' and a second proxy-proxy communication channel 410'' (generally proxy-proxy communication channel 410). The client 110 communicates with the first content server proxy 115' which communicates with the second content server proxy 115''. The second content server proxy 115'' communicates with the third content server proxy 115''' and then the third content server proxy 115''' communicates with the content server 120 over the proxy-server communication channel 145 to establish the communication session with the content server 120. Further, although the embodiment described above includes a ticket having a client ticket and a content server proxy ticket, another embodiment includes the ticket comprising numerous tickets.

Figure 4B:
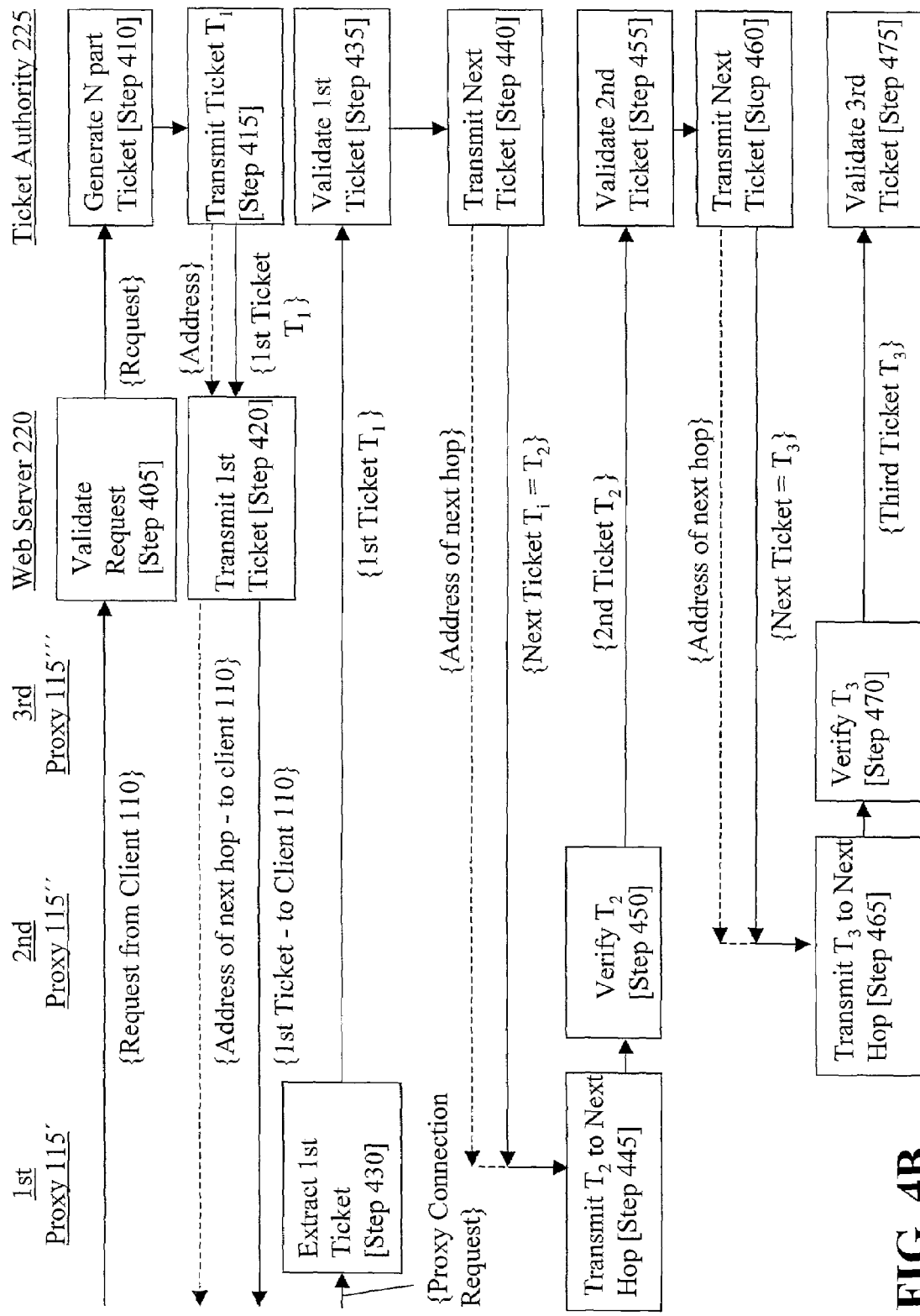
FIG. 4B is a flow diagram illustrating an embodiment of the operation of the communications system of FIG. 4A in accordance with the invention.

More explicitly and also referring to FIG. 4B, the web server 220 receives a request from the client 110 for an application and the web server 220 validates the request with the ticket authority 225 (step 405). The ticket authority 225 then generates an N part ticket (e.g., $T_1$ to $T_N$) in step 410. In one embodiment, the ticket authority 225 then transmits a portion $T_i$ of the N part ticket (e.g., the first part of the ticket, or first ticket $T_1$) to the web server 220 (step 415). The web server 220 then transmits the ticket $T_1$ to the client 110 (step 420). In one embodiment, the ticket authority 225 also transmits the address of the next "hop" (e.g., the first content server proxy 115') to the web server 220, which then transmits the address to the client 110. This address is the address of the next hop (e.g., content server proxy 115) that this hop (e.g., client 110) needs to communicate with for the client 110 to eventually be authenticated to the content server 120.

The client 110 uses the address to then contact the next "hop" (e.g., first content server proxy 115') and initiates a communication session with the first content server proxy 115' by transmitting a proxy connection request over the client-proxy communication channel 135. The first content server proxy 115' then extracts (step 430) the first ticket $T_1$ from the proxy connection request and forwards this ticket to the ticket authority 225 for validation. The ticket authority 225 then validates (step 435) the first ticket $T_1$.

Upon proper verification of the first ticket $T_1$, the ticket authority 225 transmits the next ticket $T_i$ from the N part ticket (e.g., $T_2$) to the next content server proxy 115 (e.g., first content server proxy 115') (step 440). In some embodiments, the ticket authority 225 also transmits the address of the next hop (e.g., the second content server proxy 115") to this hop (e.g., the first content server proxy 115'). The first content server proxy 115' transmits this ticket to the next hop (e.g., the second content server proxy 115") (step 445). In one embodiment, the second content server proxy 115" verifies $T_2$ by transmitting the ticket to the ticket authority 225 (step 450). The ticket authority 225 validates the second ticket $T_2$ (step 455) and the process continues, as shown in steps 460 through 475. Once the last part of the N part ticket has been validated, steps 350 through 355 occur, as shown in FIG. 3, to launch the application on the client 110.

In one embodiment, each content server proxy 115 (i.e., each hop) validates $T_i$ (e.g., $T_2$) with a ticket authority 225 associated with the content server proxy 115 (i.e., hop). In this embodiment, after each content server proxy 115 validates the ticket $T_i$ (e.g., $T_2$) with a ticket authority 225, the ticket authority 225 at which the validation took place transmits the next ticket $T_{i+1}$ (e.g., $T_3$) and the address of the next content server proxy 115 (i.e., the next "hop" destination) to the content server proxy 115 that had validated the ticket $T_i$. Thus, each content server proxy 115 is associated with a ticket authority 225 that has been configured with the current and next hop tickets (i.e., validating $T_i$ and transmitting $T_{i+1}$ for the next hop). Consequently, the next content server proxy 115 acts as the client for that hop. This process is repeated until reaching the content server 120 in the communications system 405. Thus, each hop has been validated individually without revealing all of the ticket to any one hop.

In other embodiments, the ticket authority 225 may issue more than one ticket rather than issuing one ticket having many parts. For example, the ticket authority 225 generates a first hop ticket and a second hop ticket in step 410, where the first hop ticket has no association with the second hop ticket. The ticket authority 225 subsequently transmits the first hop ticket to the web server 220 and the web server 220 transmits the first hop ticket to the client 110. The client 110 transmits this first hop ticket to the content server proxy 115 (e.g., first content server proxy 115') for validation by the ticket authority 225. Upon validation in step 435, the ticket authority 225 transmits in step 440 the second hop ticket to the next content server proxy 115 (e.g., second content server proxy 115") while the first hop ticket is independent from the second hop ticket.

In a further embodiment, one or more of the ticket authorities 225 provides the content server proxies 115 with any necessary information needed to connect to the next hop, such as, but without limitation, encryption keys, SSL method configuration information, and authentication information to connect to a SOCKS server (e.g., SOCKS5 server, developed by NEC Corporation of Tokyo, Japan).

In yet another embodiment, a ticket authority 225 only generates a single ticket. The ticket authority 225 transmits the single ticket to the web server 220. The web server 220 forwards the single ticket to the client 110. The content server proxy 115 subsequently receives the ticket from the client 110 and "consumes" the single ticket upon validation. As a result, the communications system 205 can use a single ticket to provide the ability to use arbitrary communication protocols over the client-proxy communication channel 135 and the client-web server communication channel 240. Additionally, because the content server 120 does not receive or verify the single ticket, the ticket is transparent to the content server 120 and, consequently, the content server 120 is not "aware" of the use of the ticket.

By exploiting the security of the secure communications between the client 110 and the web server 220 over the secure client-web server communication channel 240, the communications system 205 establishes a secure communication link over the non-secure client-proxy communication channel 135 to remotely display desktop applications securely on the client 110.

In yet another embodiment and referring again to FIG. 3, the ticket authority 225 transmits in step 315 a disabled version of the content server proxy ticket with the client ticket to the web server 220 for transmission to the client 110. The client 110 subsequently transmits (step 325) the content server proxy ticket along with the client ticket to the content server proxy 115 as part of the proxy connection request. The content server proxy 115 then forwards both tickets to the ticket authority 225. Upon receiving a disabled content server proxy ticket, the ticket authority 225 enables the content server proxy ticket after validating the client ticket. The ticket authority 225 then transmits the enabled content server proxy ticket to the content server proxy 115 for authentication to the content server 120.

Alternatively, in another embodiment the web server 220 receives a disabled content server proxy ticket and an enabled client ticket from the ticket authority 225 and only transmits the client ticket to the client 110. The client 110 transmits (step 325) the client ticket to the content server proxy 115 as part of the proxy connection request. The content server proxy 115 then forwards the client ticket to the ticket authority 225. The ticket authority 225 validates the client ticket and, upon validation, enables the content server proxy ticket previously transmitted to the web server 220. In yet another embodiment, the ticket authority 225 transmits an enabled content server proxy ticket to the web server 220 upon validation of the client ticket for authentication to the content server 120.

Thus, at any given time, the ticket authority 225 provides only one ticket that is enabled to the client 110 or content server proxy 115 that the ticket authority 225 can validate. The ticket authority 225 may provide another ticket that can't be validated (i.e., a disabled ticket) until the enabled ticket is validated. Alternatively, the ticket authority 225 may not transmit the content server proxy ticket to the content server proxy 115 until the ticket authority 225 validates the enabled ticket. As discussed in further detail below, this enforces network routing of communications using the communications system 205 because the client 110 cannot traverse the web server 220 or the content server proxy 115 without having the ticket authority 225 validate the enabled ticket and transmit the ticket needed to communicate with the content server 120.

In another embodiment, instead of transmitting the content server proxy ticket to the content server proxy 115 as in step 340, the ticket authority 225 transmits the content server proxy ticket to the web server 220 directly over the web server-authority communication channel 250. The web server 220 then automatically transmits the content server proxy ticket to the content server 120. In other words, the web server 220 "pushes" the content server proxy ticket to the content server 120. The ticket authority 225 can also push the content server proxy ticket to the content server 120 without transmission of the content server proxy ticket to the content server proxy 115 or the web server 220.

In yet another embodiment, the content server 120 retrieves the content server proxy ticket from the ticket authority 225 over the ticket-content server communication channel 257. In other words, the content server 120 "pulls" the content server proxy ticket from the ticket authority 225. The above examples are illustrations of techniques used to eliminate step 345 (while modifying the destination of the transmission in step 340).

Moreover, the invention enforces the routing of the client 110 through the content server proxy 115. As stated above, the client 110 has to possess the content server proxy ticket to establish a communication session with the content server 120. More specifically, to establish a connection with the content server 120, the web server 220 first has to validate the request of the client 110 with the ticket authority 225. Once validated, the client 110 obtains the first ticket and transmit this first ticket to the ticket authority 225 for validation. However, upon validation, the ticket authority 225 transmits the content server proxy ticket back to the content server proxy 115 rather than the client 110. The communication session between the client 110 and the content server 130 is established when the content server 130 receives the content server proxy ticket. Thus, the client 110 has to communicate with the content server proxy 115 in order to have the content server proxy ticket transmitted to the content server 130, thereby enforcing the routing of the client 110 through the content server proxy 115. Thus, the invention can ensure the proper traversal of a security device (e.g., the content server proxy 115) before granting access to the content server 120.

For example, a content server 120 executes several applications, such as MICROSOFT WORD and MICROSOFT EXCEL, both developed by Microsoft Corporation of Redmond, Wash. In one embodiment, the client 110 uses NFUSE, developed by Citrix Systems, Inc. of Fort Lauderdale, Fla., to obtain information from the server farm 269 on which applications can be accessed by the client 110. If a client user wants to access and use MICROSOFT WORD, the client 110 requests the application from the web server 220. However, only users who pay an application fee for MICROSOFT WORD can become authorized to access the application.

To ensure the payment of the application fee, the communications system 205 includes the content server proxy 115 and the ticket authority 225 to enforce the routing of the client 110 through the content server proxy 115. The routing of the client 110 through the content server proxy 115 is valuable to the application provider if the content server proxy 115 is used to collect the application fee and authorize the user for access to the application.

The ticket authority 225 subsequently generates a ticket associated with the request for the application. An enabled first ticket is then transmitted to the client 110. Because the client 110 does not have the address of the content server 120, the client 110 cannot access the application. Further, the client 110 has not been authorized by the content server proxy 115 yet (i.e., has not yet paid). Thus, the client 110 has to communicate with the content server proxy 115 to become authorized. The content server proxy 115 can then transmit the enabled first ticket to the ticket authority 225 upon payment of the application fee.

The ticket authority then validates the client ticket and subsequently transmits (or enables) a content server proxy ticket to the proxy 115. The content server proxy 115 then transmits the content server proxy ticket to the content server 120 (e.g., assuming the client user has paid the application fee), which enables the content server 120 to transmit the application to the client 110. The communications system 205 may also use Application Launching And Embedding (ALE) technology, developed by Citrix Systems, Inc., to enable the launching of the application from or the embedding of the application into an HTML page for delivery to the client 110.

Having described certain embodiments of the invention, it will now become apparent to one of skill in the art that other embodiments incorporating the concepts of the invention may be used. Therefore, the invention should not be limited to certain embodiments, but rather should be limited only by the spirit and scope of the following claims.

What is claimed is:

1. A method of authenticating a client to a content server comprising the steps of:
generating, by a ticket authority, a ticket associated with said client, said ticket comprising a first ticket and a second ticket wherein said second ticket is disabled from use, said disabled second ticket validated by said ticket authority after the second ticket is enabled by said ticket authority;
transmitting, by said ticket authority, said first ticket to said client;
validating, by said ticket authority, said first ticket;
using, by said client, said first ticket to establish a communication session with a content server proxy after said first ticket is validated;
enabling, by said ticket authority, said second ticket for use upon said validation of said first ticket, said enabled second ticket validated by said ticket authority; and
using, by said content server proxy, said enabled second ticket to establish a communication session with said content server.

2. The method of claim 1 wherein, prior to generating said ticket associated with said client, said client is authenticated to a web server.

3. The method of claim 1 wherein said ticket authority transmits said first ticket to a web server and said web server transmits said first ticket to said client 4. The method of claim 1 wherein said client transmits said first ticket to said content server proxy.

5. The method of claim 1 wherein said content server proxy transmits said first ticket to said ticket authority and said ticket authority transmits said second ticket to said content server proxy upon validation of said first ticket.

6. The method of claim 1 wherein said content server proxy transmits said second ticket to said content server upon said enabling of said second ticket 7. The method of claim 1 wherein said content server validates said second ticket with said ticket authority.

8. The method of claim 7 wherein said content server makes a request to said ticket authority to validate said second ticket 9. The method of claim 7 wherein said ticket authority pushes said second ticket to said content server for validation.

10. The method of claim 1 wherein said ticket authority transmits said second ticket to a web server and said web server pushes said second ticket to said content server for validation.

11. The method of claim 1 wherein said ticket authority transmits said first ticket and said disabled second ticket to a web server and said web server transmits said first ticket and said disabled second ticket to said client.

12. The method of claim 11 wherein said client transmits said first ticket and said disabled second ticket to said content server proxy.

13. The method of claim 1 further comprising transmitting said disabled second ticket to at least one of said content server proxy and a web server.

14. The method of claim 1 further comprising transmitting said enabled second ticket to said content server proxy.

15. The method of claim 1 wherein a communication session protocol is established between said client and said content server.

16. The method of claim 1 wherein a first communication session protocol is established between said client and said content server proxy and a second communication session protocol is established between said content server proxy and said content server, said client communicating with said content server via said first communication session and said second communication session.

17. The method of claim 16 wherein said first communication session protocol is different from said second communication session protocol.

18. The method of claim 1 wherein a first communication session protocol is established between said client and said content server proxy and a second communication session protocol is established between said client and a web server.

19. The method of claim 18 wherein said first communication session protocol is different from said second communication session protocol.

20. The method of claim 1 wherein said client comprises a web based browser.

21. The method of claim 1 wherein said content server proxy is a secure socket layer relay.

22. The method of claim 1 wherein said transmitting of said second ticket to said content server proxy further comprises transmitting an address of said content server to said content server proxy.

23. A system for authenticating a user comprising:
a client;
a ticket authority;
a content server; and
a content server proxy in communication with said client, said ticket authority, and said content server,
wherein said ticket authority generates a first ticket and a second ticket, said second ticket is generated before said first ticket is validated by the ticket authority and said second ticket is disabled from use, said disabled second ticket validated by said ticket authority after the second ticket is enabled by said ticket authority;
wherein said first ticket is transmitted to said client and used to establish a first communication session with said content server proxy, and
wherein said second ticket is transmitted to said content server proxy and used to establish a second communication session with said content server.

24. The system of claim 23 wherein, prior to said ticket authority generating said ticket associated with said client, said client is authenticated to a web server.

25. The system of claim 23 wherein said ticket authority transmits said first ticket to a web server and said web server transmits said first ticket to said client.

26. The system of claim 23 wherein said client transmits said first ticket to said content server proxy.

27. The system of claim 23 wherein said content server proxy transmits said first ticket to said ticket authority and said ticket authority transmits said second ticket to said content server proxy.

28. The system of claim 23 wherein said content server proxy transmits said second ticket to said content server.

29. The system of claim 23 wherein said content server validates said second ticket with said ticket authority.

30. The system of claim 29 wherein said content server makes a request to said ticket authority to validate said second ticket.

31. The system of claim 29 wherein said ticket authority pushes said second ticket to said content server for validation.

32. The system of claim 23 wherein said ticket authority transmits said second ticket to a web server and said web server pushes said second ticket to said content server for validation.

33. The system of claim 23 wherein the second ticket is disabled and transmitted with said first ticket to said client.

34. The system of claim 33 wherein said ticket authority transmits said first ticket and said disabled second ticket to a web server and said web server transmits said first ticket and said disabled second ticket to said client.

35. The system of claim 33 wherein said client transmits said first ticket and said disabled second ticket to said content server proxy.

36. The system of claim 33 wherein said content server proxy transmits said first ticket and said disabled second ticket to said ticket authority and said ticket authority enables said disabled second ticket.

37. The system of claim 36 further comprising transmitting said enabled second ticket to said content server proxy.

38. The system of claim 23 wherein a communication session protocol is established between said client and said content server.

39. The system of claim 23 wherein a first communication session protocol is established between said client and said content server proxy and a second communication session protocol is established between said content server proxy and said content server.

40. The system of claim 39 wherein said first communication session protocol is different from said second communication session protocol.

41. The system of claim 23 wherein a first communication session protocol is established between said client and said content server proxy and a second communication session protocol is established between said client and a web server.

42. The system of claim 41 wherein said first communication session protocol is different from said second communication session protocol.

43. The system of claim 23 wherein said client comprises a web based browser.

44. The system of claim 23 wherein said content server proxy is a secure socket layer relay.

45. A system for authenticating a user comprising:
a client;
a ticket authority generating a first ticket and a second ticket wherein said second ticket is generated before said first ticket is validated and said second ticket disabled from use, said disabled second ticket validated by said ticket authority after the second ticket is enabled by said ticket authority;
a content server;
a content server proxy in communication with said client, said ticket authority, and said content server and receiving said first ticket; and
a web server in communication with said client and said ticket authority,
wherein said content server proxy establishes a first communication session between said client and said content server proxy after said ticket authority validates said first ticket,
wherein said ticket authority enables said second ticket after said validation of said first ticket, said enabled second ticket validated by said ticket authority, and wherein said content server proxy uses said enabled second ticket to establish a second communication session with a protocol different from said first communication session protocol.

46. The system of claim 45 wherein said client is authenticated to said web server.

47. The system of claim 45 wherein said ticket authority transmits said first ticket to said web server.

48. The system of claim 45 wherein said web server transmits said first ticket to said client.

49. The system of claim 45 wherein said client transmits said first ticket to said content server proxy.

50. The system of claim 45 wherein said content server proxy transmits said first ticket to said ticket authority.

51. The system of claim 45 wherein said ticket authority transmits said enabled second ticket to said content server proxy.

52. The system of claim 45 wherein said content server proxy transmits said enabled second ticket to said content server.

53. The system of claim 45 wherein said content server validates said enabled second ticket with said ticket authority.

54. The system of claim 53 wherein said content server makes a request to said ticket authority to validate said enabled second ticket.

55. The system of claim 53 wherein said ticket authority pushes said enabled second ticket to said content server for validation.

56. The system of claim 45 wherein said ticket authority transmits said second ticket to said web server and said web server pushes said second ticket to said content server for validation.

57. The system of claim 45 wherein the second ticket is disabled and transmitted with said first ticket to said client.

58. The system of claim 57 wherein said ticket authority transmits said first ticket and said disabled second ticket to said web server and said web server transmits said first ticket and said disabled second ticket to said client.

59. The system of claim 57 wherein said client transmits said first ticket and said disabled second ticket to said content server proxy.

60. The system of claim 57 wherein said content server proxy transmits said first ticket and said disabled second ticket to said ticket authority and said ticket authority enables said disabled second ticket.

61. The system of claim 60 further comprising transmitting said enabled second ticket to said content server proxy.

62. The system of claim 45 wherein a communication session protocol is established between said client and said content server.

63. The system of claim 45 wherein a third communication session protocol is established between said content server proxy and said content server.

64. The system of claim 63 wherein said first communication session protocol is different from said third communication session protocol.

65. The system of claim 45 wherein said client comprises a web based browser.

66. The system of claim 45 wherein said content server proxy is a secure socket layer relay.

67. A system for authenticating a user comprising:
means for generating, by a ticket authority, a first ticket and a second ticket, wherein said second ticket is generated before said first ticket is validated by the ticket authority and said second ticket disabled from use, said disabled second ticket validated by said ticket authority after the second ticket is enabled by said ticket authority;
means for transmitting, by said ticket authority, said first ticket to said client;
means for using, by said client, said first ticket to establish a first communication session with a content server proxy;
means for transmitting, by said ticket authority, said second ticket to said content server proxy; and
means for using, by said content server proxy, said second ticket to establish a second communication session with a content server.

* * * * *